United States Patent
MacDonald et al.

(10) Patent No.: US 7,338,446 B2
(45) Date of Patent: Mar. 4, 2008

(54) METHOD AND APPARATUS FOR CONTROLLING POWER IN AN ULTRASOUND SYSTEM

(75) Inventors: Michael Charles MacDonald, New Berlin, WI (US); Richard Yung Chiao, Menomonee Falls, WI (US); Yadong Li, Albany, CA (US); Lihong Pan, Brookfield, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/838,400

(22) Filed: May 4, 2004

(65) Prior Publication Data
US 2005/0251045 A1    Nov. 10, 2005

(51) Int. Cl.
*A61B 8/00* (2006.01)
(52) U.S. Cl. .................................... 600/437
(58) Field of Classification Search ............ 600/437, 600/443, 447, 459; 706/924
See application file for complete search history.

(56) References Cited

U.S. PATENT DOCUMENTS

| | | | |
|---|---|---|---|
| 4,603,702 A * | 8/1986 | Hwang et al. .............. 600/437 |
| 4,708,127 A * | 11/1987 | Abdelghani ................... 601/2 |
| 4,791,915 A * | 12/1988 | Barsotti et al. ................ 601/2 |
| 4,945,767 A * | 8/1990 | Shirasaka ..................... 73/610 |
| RE33,435 E | 11/1990 | Koblasz et al. |
| 5,184,605 A | 2/1993 | Grzeszykowski |
| 5,409,007 A * | 4/1995 | Saunders et al. ........... 600/447 |
| 5,482,046 A * | 1/1996 | Deitrich ...................... 600/458 |
| 5,630,417 A | 5/1997 | Petersen et al. |
| 5,654,509 A | 8/1997 | Miele et al. |
| 5,676,149 A * | 10/1997 | Yao .............................. 600/437 |
| 5,924,979 A * | 7/1999 | Swedlow et al. ........... 600/300 |
| 6,086,535 A * | 7/2000 | Ishibashi et al. ............ 600/439 |
| 6,183,426 B1 * | 2/2001 | Akisada et al. ................ 601/2 |
| 6,440,073 B1 | 8/2002 | Robinson et al. |
| 6,450,958 B1 * | 9/2002 | Linkhart et al. ............ 600/437 |
| 6,471,651 B1 * | 10/2002 | Hwang et al. .............. 600/459 |
| 6,527,719 B1 | 3/2003 | Olsson et al. |
| 6,592,521 B1 * | 7/2003 | Urbano et al. .............. 600/441 |
| 6,610,011 B2 * | 8/2003 | Emery ......................... 600/437 |
| 6,714,667 B1 * | 3/2004 | Mooney et al. ............. 382/128 |
| 7,156,551 B2 * | 1/2007 | Ramamurthy et al. ...... 374/119 |

* cited by examiner

Primary Examiner—Francis J. Jaworski
(74) Attorney, Agent, or Firm—The Small Patent Law Group LLP; Dean D. Small

(57) ABSTRACT

Methods and systems for controlling an ultrasound system are provided. The method includes receiving scanning information from an ultrasound system, with the scanning information including at least one of image information and spectral information. The method further includes controlling power to a transducer of the ultrasound system based on the scanning information.

21 Claims, 5 Drawing Sheets

METHOD AND APPARATUS FOR CONTROLLING POWER IN AN ULTRASOUND SYSTEM

BACKGROUND OF THE INVENTION

The present invention relates generally to ultrasound systems. More specifically, the present invention relates to a method and system for monitoring an ultrasound system and controlling the power supplied to a transducer of the ultrasound system.

Ultrasound systems typically include a probe with a transducer that generates acoustic waves and receives the echoes of these waves, for example, as reflected by part of a human body being examined. Further, the ultrasound systems typically include a processor that performs processing of the received scanning information and controls the operation of the probe transducer (e.g., controls activation of elements of the transducer). The amplitude, frequency and duration of the pulses emitted from the probe transducer may be changed using transducer pulse controls. A display provides the image from the ultrasound information processed by the processor. A keyboard or other user input or interface may be provided to input data or control commands data.

The transducer is used to perform diagnosis of, for example, a body part of a patient. However, when the transducer is not used for performing diagnosis for a certain period, but is still powered, the ultrasound system becomes idle and the transducer "scans in the air" (e.g., scanning, but not acquiring images because no patient is present). In order to reduce or avoid scanning in the air, ultrasound systems currently include an automatic time out or freeze feature that halts the scanning and turns off power to the transducer if no user inputs (e.g. keyboard events) have been detected for a predefined time period. The functionality of this feature assumes that the user will be actively interfacing with the ultrasound system. As a consequence, even if the user is performing diagnosis using the probe, but has not performed any keyboard operations for the predefined time period, this feature may freeze the ultrasound system during the diagnosis. Therefore, the users sometimes disable this feature to avoid inconvenience, due to unwanted freezing of the ultrasound system.

When the time-out or freeze feature is not enabled, there exists a possibility that the system will continue scanning for hours, even at a time when there is no diagnosis being performed and the transducer is scanning in the air. This may result in more rapid wear on the system components, such as the probe, transmit-receive circuitry, etc. This may result in increased costs, such as, for example, maintenance and replacements costs. Additionally, scanning in the air may cause the temperature of the probe to exceed acceptable or required levels (e.g., exceed compliance requirements). Thus, when the automatic time-out or freeze feature is disabled or not present, the probe may be left scanning in the air, which may lead to an increase in transducer lens temperature. In such a case, it may not be suitable to use the transducer for performing the diagnosis because of non-compliance with mandated guidelines and/or possibility of causing harm to a patient.

Thus, known ultrasound systems may not adequately provide for powering off a probe when the probe is scanning with no images being acquired (e.g., probe on and no patient being scanned).

BRIEF DESCRIPTION OF THE INVENTION

In one embodiment, a method for controlling an ultrasound system is provided. The method includes receiving scanning information from an ultrasound system, with the scanning information including at least one of image information and spectral information. The method further includes controlling power to a transducer of the ultrasound system based on the scanning information.

In another embodiment, an ultrasound system is provided. The ultrasound system includes a probe having a transducer, with the probe operable to provide scanning information, including at least one of image information and spectral information. The ultrasound system further includes a controller for controlling power to the transducer based upon the scanning information.

DETAILED DESCRIPTION OF THE INVENTION

The present invention provides methods and systems for monitoring an ultrasound system and controlling power to a transducer based on the state of the monitored system.

Figure 1:
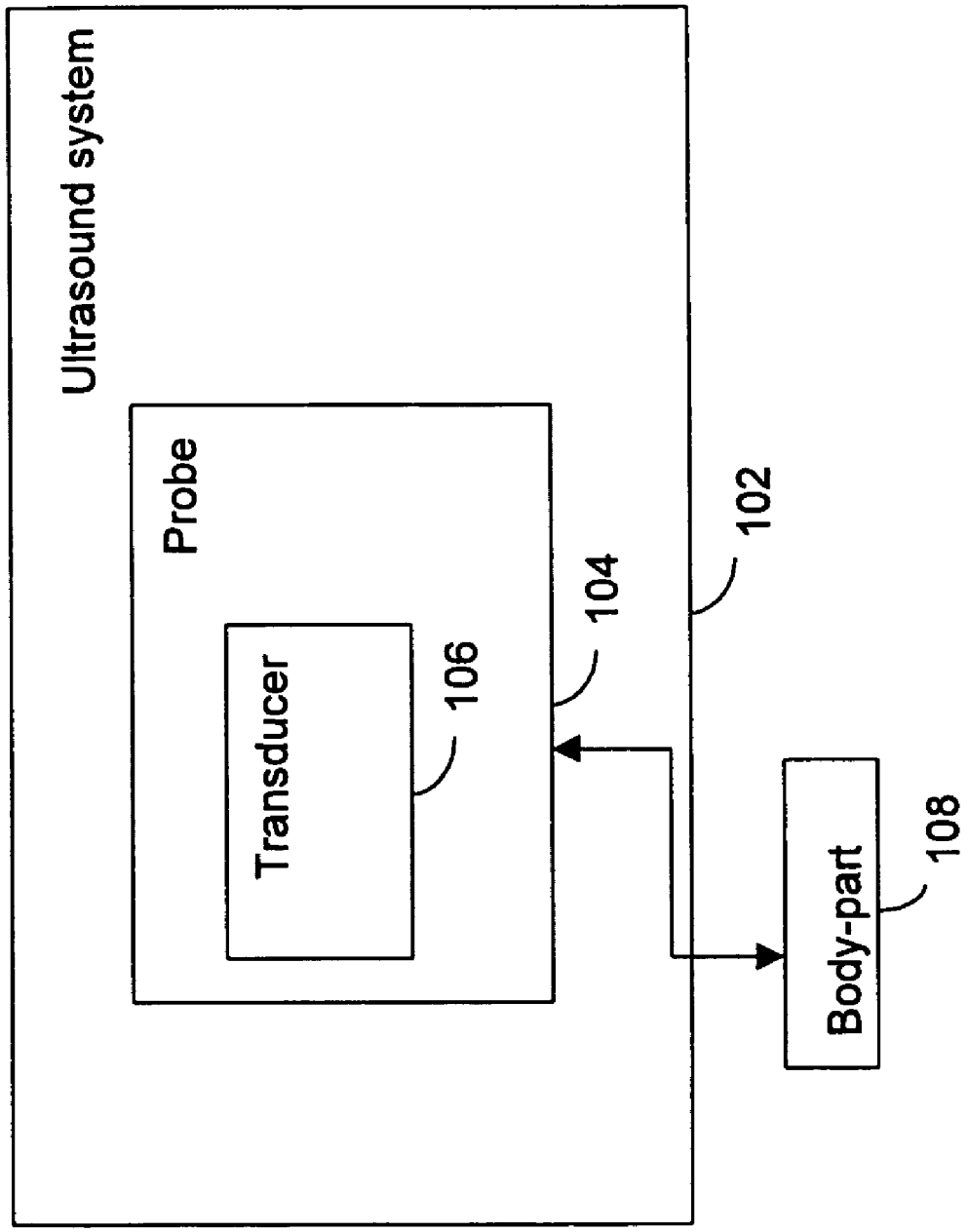
FIG. 1 is a block diagram illustrating the operational environment of various embodiments of the present invention.

FIG. 1 is a block diagram illustrating the operational environment of various embodiments of the present invention. Ultrasound system 102 includes a probe 104 having a transducer 106. Transducer 106 within probe 104 generates acoustic waves and receives the echoes as reflected by an object, such as, for example, a body part 108 under examination. Transducer 106 may use piezoelectric effect to communicate the scanning information regarding body part 108 to ultrasound system 102. Probe 104, therefore, provides scanning information regarding body part 108.

Figure 2:
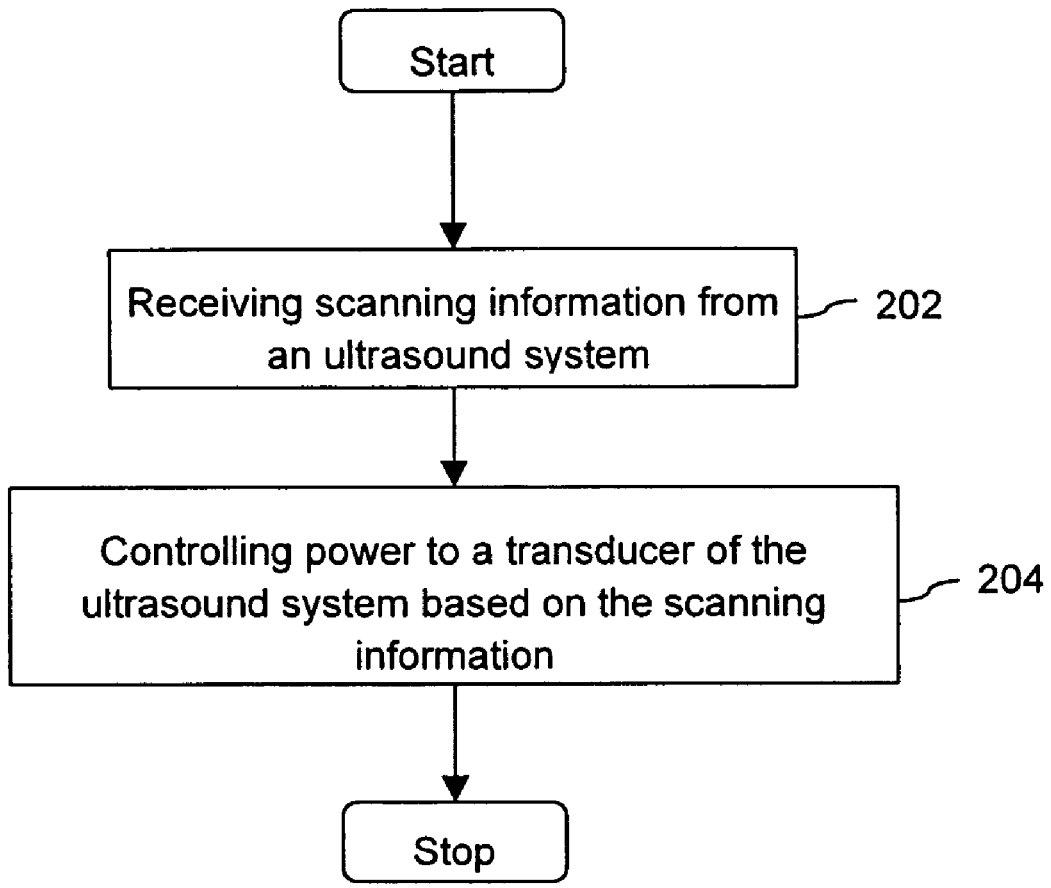
FIG. 2 is a flowchart illustrating a process for monitoring an ultrasound system in accordance with an embodiment of the present invention.

FIG. 2 is a flowchart illustrating a process for monitoring an ultrasound system in accordance with an embodiment of the present invention. At 202, scanning information from ultrasound system 102 (shown in FIG. 1) is received. At 204, the power to transducer 106 (shown in FIG. 1) is controlled based on the scanning information. The scanning information received at 202 may be, for example, image information or spectral information or a combination of both. The scanning information may further include received raw frequency data.

The image information may include pixel information, which may be analyzed in a lateral direction (parallel to the face of transducer 106) for each axial depth. Analysis of pixel information in the lateral direction is particularly useful to reduce non-diagnostic bands such as, for example, zone matching bands, which may distort the analysis. Such non-diagnostic bands may be construed, for example, as anatomy and output power reduced even though there is no real time diagnosis being performed.

An example of pixel information that may be monitored is B-mode pixel information. B-mode is a two-dimensional ultrasound image display composed of bright dots representing the ultrasound echoes. The brightness of each dot is determined by echo amplitude. In a B-mode display, the pixel information comprises pixel brightness. It should be noted that use of B-Mode pixel information is only exemplary in nature and in no way limits the scope of the various embodiments of the invention, which may be implemented using other forms of image information, including other forms of pixel information.

An example of spectral information that may be monitored is pulsed wave spectrum information. The analysis of spectral information may be needed when the B-mode image information is turned off and only pulsed wave vectors are provided.

In various embodiments of the present invention, the pixel information at axial depths that are near the field of transducer 106 (shown in FIG. 1) may or may not be used to control power to an ultrasound system as described herein. In one embodiment, pixel information at axial depths of about zero to about two mm are not used.

Figure 3:
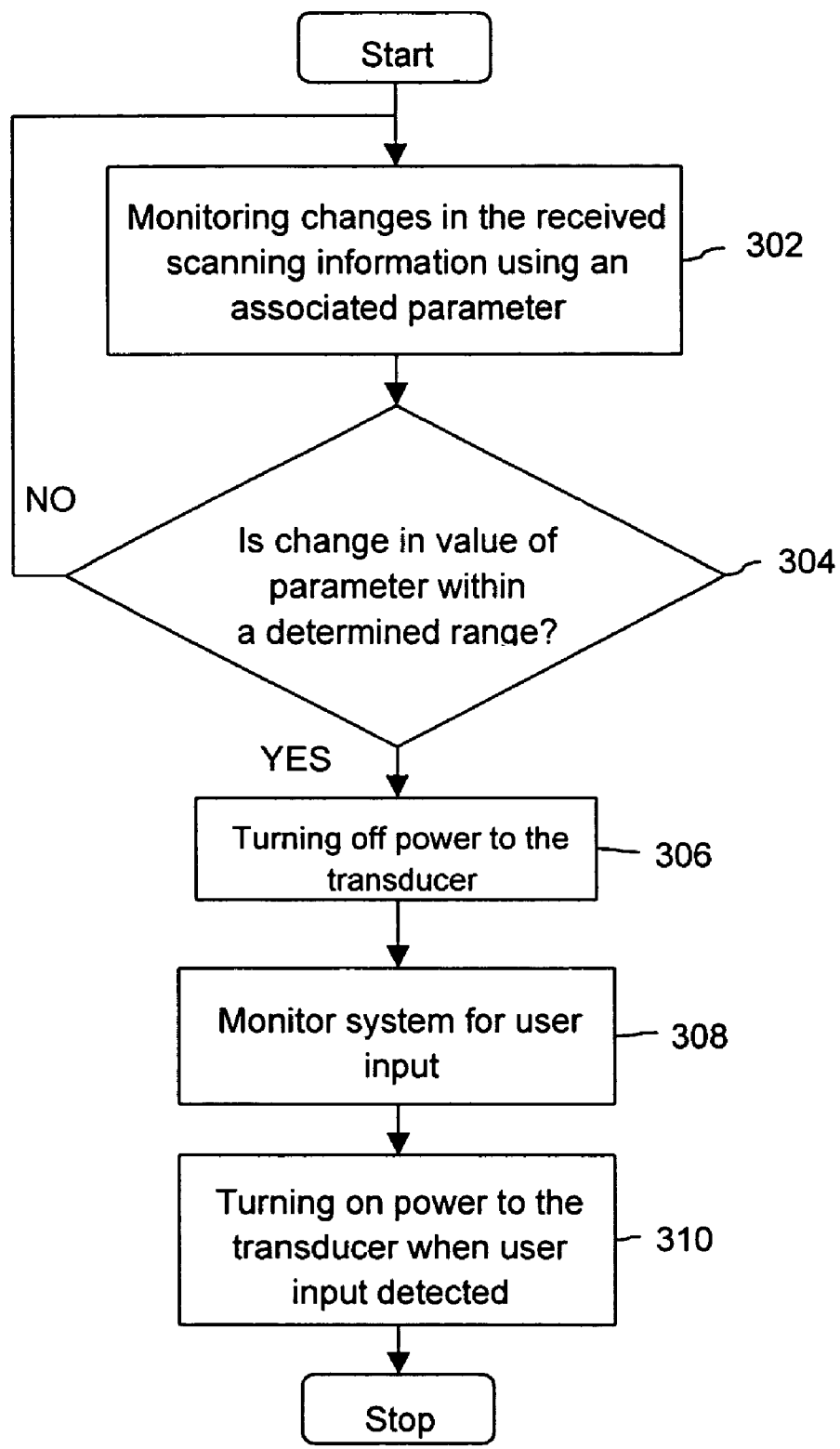
FIG. 3 is a flowchart illustrating a method for controlling power to a transducer in accordance with an embodiment of the present invention.

FIG. 3 is a flowchart illustrating a method for controlling power to transducer 106 (shown in FIG. 1) in accordance with an embodiment of the present invention. At 302, changes in the received scanning information are monitored using an associated parameter. The monitoring is done temporally, for example, every five to ten seconds. It should be noted that the periodicity of monitoring is not limited to the above-mentioned time frame and may be adjusted, for example, based on specific requirements and processing capabilities of the ultrasound system.

The parameter associated with the image information in one embodiment includes individual pixel brightness values along with the maximum and minimum pixel brightness values over a range of pixels. A maximum pixel brightness value may be calculated along a horizontal line of the display of ultrasound system 102 (shown in FIG. 1) or along each of a plurality of horizontal lines of the display of ultrasound system 102. The parameter associated with the spectral information comprises the frequency range in the pulsed wave spectrum.

It should be noted that the parameter may be any statistical parameter. For example, the parameter may be a mean value of the scanning information available at a particular time. Changes are then monitored temporally with respect to the mean. Other examples of the statistical parameters include the standard deviation of the scanning information values or the standard deviation of the mean value of the scanning information.

At 304 a determination is made as to whether the change in the value of the associated parameter is within a determined range. The change in value is monitored over a predetermined time period. The predetermined time period may be in the range of, but is not limited to, one to fifteen minutes or, for example, about two minutes. The determined range may be the tolerance of ultrasound system 102 (shown in FIG. 1). For example, the determined range may be defined as values within one percent of the parameter value. If the change in value of the parameter is not within the determined range, monitoring continues at 302. However, if the change in value of the parameter is within the determined range for the predetermined time period, power to transducer 106 (shown in FIG. 1) is turned off at 306. At 308, ultrasound system 102 is then monitored for a user input. Thereafter, at 310, power to transducer 106 is turned on in response to the user input. Thus, the user would turn on probe 104 (shown in FIG. 1) when a scan is required. The user input may be, for example, a "freeze" key on a keyboard. The "freeze" key on the keyboard may be a toggle for turning on/off the power to transducer 106. Any other user input also may be configured for turning on probe 104.

The statistical analysis performed to determine a change in the parameter may be, for example, determining maximum pixel brightness along each of a plurality of horizontal lines of a display of ultrasound system 102 (shown in FIG. 1). The maximum pixel brightness further may be an average pixel brightness value along each horizontal line. In an exemplary embodiment, the mean of all such values is taken along each horizontal line at a particular time. Over a predetermined time period of, for example, two minutes, the image information is monitored every five seconds. Thus, the change in twenty-four such mean values is then observed. If the change is less than, for example, one percent of the mean value measured at time $t=0$ ($0 \leq t \leq 120$ seconds), the power to transducer 106 (shown in FIG. 1) is turned off.

In another exemplary embodiment, where the spectral information is used for the analysis, the displayed frequency range of spectral information may be divided into N sections or bins. N may be, for example, the number of frequency samples. The average of each bin is determined, for example, every ten seconds. Thus, over a predetermined time period of two minutes, the change in twelve such values is monitored. If the change is within the determined range then the power to transducer 106 (shown in FIG. 1) is turned off.

It should be noted that the statistical analysis is not limited to the above-mentioned embodiments, which are merely exemplary in nature and do not limit the scope of the various embodiments invention. Any type of statistical analysis may be used for analyzing the scanning information to determine a change in value of the associated parameter. Examples of possible statistical analysis include standard deviation, linear combination and the like.

Figure 4:
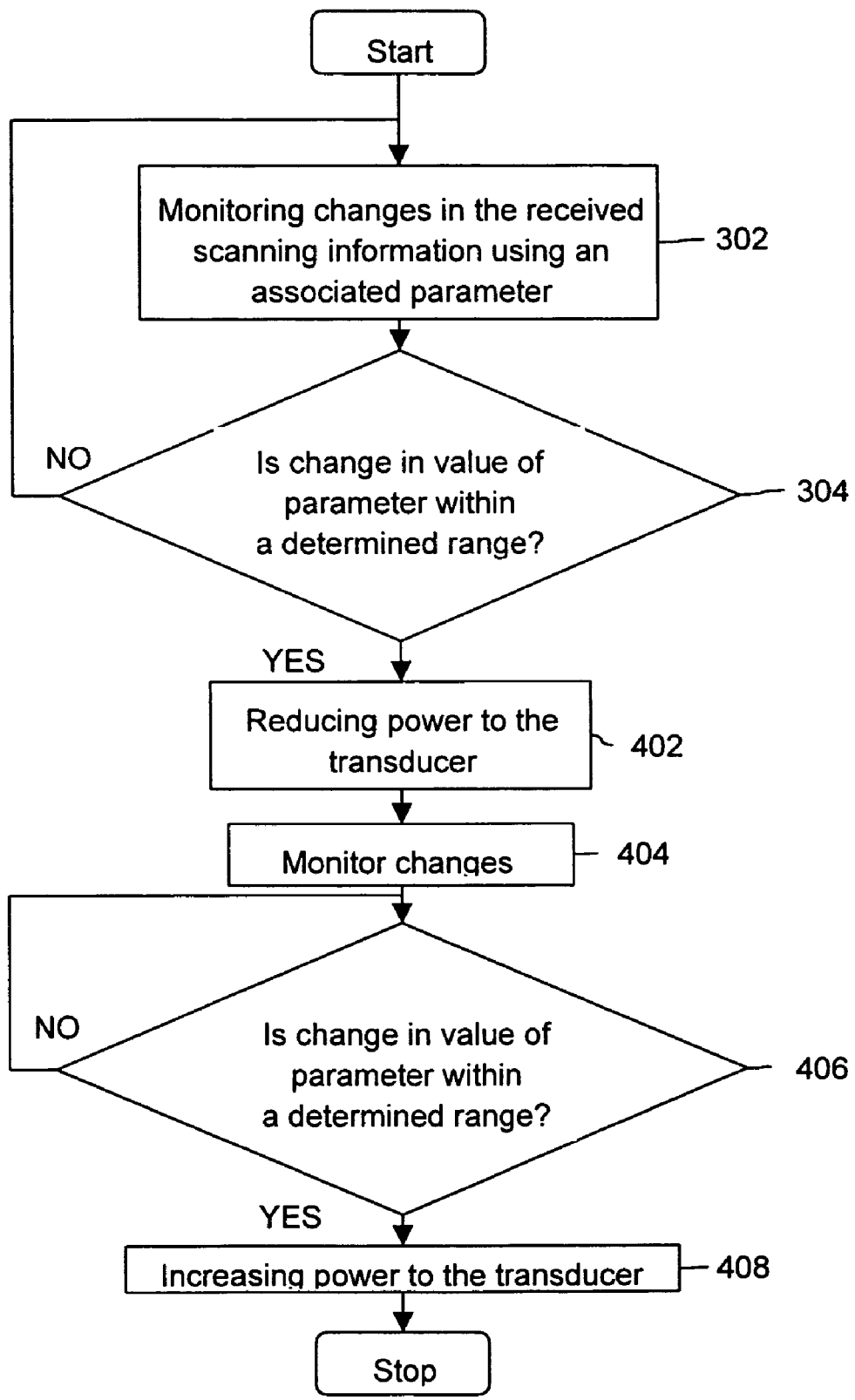
FIG. 4 is a flowchart illustrating a method for controlling power to a transducer in accordance with another embodiment of the present invention.

FIG. 4 is a flowchart illustrating a method for controlling the power to transducer 106 (shown in FIG. 1) in accordance with another embodiment of the present invention. Monitoring of a parameter and determining change in the parameter are performed at 302 and 304 as described in more detail above with respect to FIG. 3. However, in this embodiment, if the change in value of the parameter is within the determined range for the predetermined time period, the power to transducer 106 is reduced at 402. For example, the reduction may be about seventy-five percent or more of the maximum power to transducer 106. The change in the value of the parameter is further monitored temporally at 404, but now at more frequent rate, for example, every 0.5 seconds. This ensures that once the user starts performing any real diagnosis or scanning (e.g., ultrasound scan), ultrasound system 102 (shown in FIG. 1) may be restored to its 'pre-reduced' state almost instantaneously and there is no delay or change in the image that is expected by the user. Further, loss of important or critical image data due to undue time delay in restoring power to the system is reduced or eliminated.

At 406 a determination is made as to whether the change in the value of the parameter is within the determined range. The change in value is monitored over the predetermined time period. If the change in value of the parameter is not within the determined range, power to ultrasound system 102 (shown in FIG. 1), and more particularly, power to transducer 106 (shown in FIG. 1) is restored (e.g., increased to pre-reduced or full power level) at 408. However, if the change in value of the parameter is within the determined range, the power to transducer 106 is maintained at the reduced level and ultrasound system 102 continues to monitor changes in the parameter.

Figure 5:
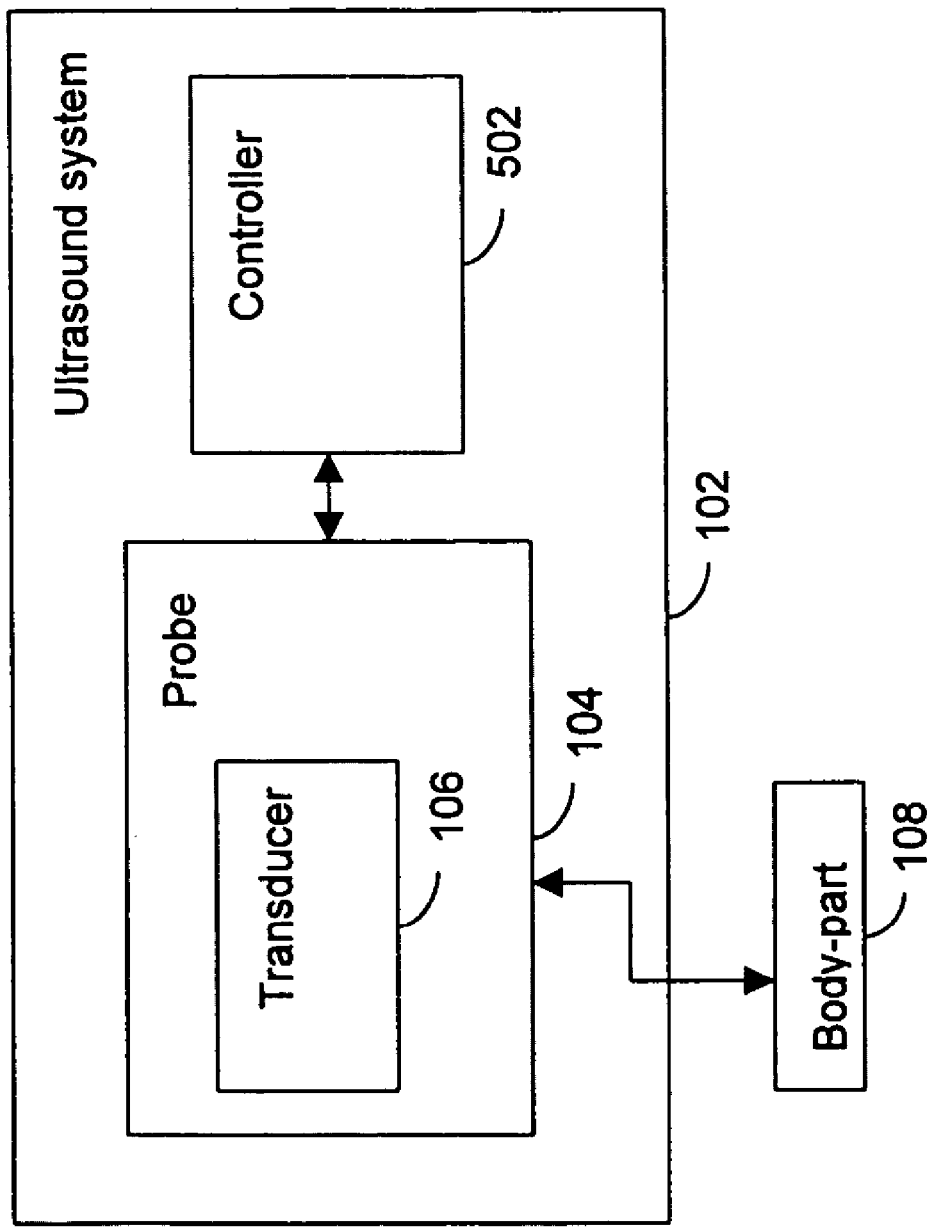
FIG. 5 is a block diagram of an ultrasound system in accordance with various embodiment of the present invention.

FIG. 5 is a block diagram of an ultrasound system in accordance with various embodiments of the present invention. Ultrasound system 102 includes probe 104 and a controller 502. Probe 104 has transducer 106. Probe 104 is operated to provide scanning information related to, for example, body part 108 being examined. Controller 502 controls the power to transducer 106 based upon the scanning information. The scanning information includes at least one of image information and spectral information. Controller 502 monitors the current operating state of ultrasound system 102 and accordingly, controls the power to transducer 106 based upon at least one of image information and spectral information. For example, if the user turns off the image information, controller 502 receives an input from ultrasound system 102 and thereafter, controls the power to transducer 106 based upon the spectral information. The power is controlled either by turning off the power to transducer 106 or reducing power to transducer 106. This reduces the likelihood that ultrasound system 102 continues to operate for extended periods of time when there is no real diagnosis being performed and transducer 106 is simply "scanning in the air."

In various embodiments of the present invention, a speckle reduction filter may be used when the scanning information includes spectral information. The speckle reduction filter removes noise that may otherwise be interpreted as scanning information and may distort the subsequent analysis. However, the information on the display need not have the speckle reduction filter applied thereto.

Various embodiments of the present invention provide an improved ultrasound system that controls the power to the transducer based on scanning information received in real time. This results in less wear on components such as the probe and transmit-receive circuitry that may be operating when the ultrasound system is left "scanning in the air" unnecessarily for long durations. For example, the transmit-receive circuitry may include hardware components used for the transmission and reception of the ultrasonic energy. The transmit side may experience significant thermal wear on the solid-state devices, which is unnecessary if no diagnosis is being performed. Various embodiments of the present invention also allow for compliance with certain guidelines or mandates (e.g., IEC 60601-2-37 lens temperature requirements).

Further, various embodiments of the present invention allow for different scanning information to be used for controlling power to the transducer, and may include, for example, image information or spectral information or a combination of both. Therefore, the power is controlled even when the B-mode image is turned off and only pulsed wave vectors are present.

Various embodiments of the present invention may be implemented or embodied in the form of a computer system. Examples of a computer system include a general-purpose computer, a programmed microprocessor, a micro-controller, a peripheral integrated circuit element, and other devices or arrangements of devices that are capable of implementing the methods of the various embodiments of the present invention.

The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive and the like. The storage device can also be other similar means for loading computer programs or other instructions into the computer system.

The computer system executes a set of instructions that are stored in one or more storage elements, in order to process input data. The storage elements may also hold data or other information as desired. The storage element may be in the form of an information source or a physical memory element within the processing machine.

The set of instructions may include various commands that instruct the processing machine to perform specific tasks such as the steps of the methods of various embodiments of the present invention. The set of instructions may be in the form of a software program. The software may be in various forms such as system software or application software. Further, the software may be in the form of a collection of separate programs, a program module within a larger program or a portion of a program module. The software may also include modular programming in the form of object-oriented programming. The processing of input data by the processing machine may be in response to user commands, or in response to results of previous processing, or in response to a request made by another processing machine.

While the invention has been described in terms of various specific embodiments, those skilled in the art will recognize that the invention can be practiced with modification within the spirit and scope of the claims.

What is claimed is:

1. A method for controlling an ultrasound system during an idle mode, said method comprising:
receiving scanning information from an ultrasound system, the scanning information including at least one of image information and spectral information;
monitoring the scanning information temporally; and
controlling power to a transducer of the ultrasound system based on the scanning information, wherein the scanning information is monitored more frequently when power to the transducer is reduced for the idle mode than when the transducer is powered for a non-idle mode.

2. A method in accordance with claim 1, wherein the controlling comprises turning off power to the transducer based on the scanning information.

3. A method in accordance with claim 1, wherein the controlling comprises reducing power to the transducer based on the scanning information.

4. A method in accordance with claim 1, wherein the monitoring comprises measuring a change in a parameter associated with the scanning information.

5. A method in accordance with claim 4, wherein the controlling is based on a measured change in a value of the parameter.

6. A method in accordance with claim 4, wherein the controlling is based on a measured change in the mean value of the parameter.

7. A method in accordance with claim 4, wherein the controlling is based on a measured change in a value of the parameter during a predetermined time period.

8. A method in accordance with claim 4, wherein the parameter comprises one of pixel brightness and spectral amplitude.

9. A method in accordance with claim 4, wherein the parameter comprises one of maximum pixel brightness and spectral amplitude.

10. A method in accordance with claim 4, wherein the parameter comprises pixel brightness and further comprising determining a maximum pixel brightness value along one of a horizontal line and a vertical line of a display of the ultrasound system.

11. A method in accordance with claim 10, wherein the maximum pixel brightness value is an average value.

12. method in accordance with claim 4, wherein the parameter comprises pixel brightness and further comprising determining a maximum pixel brightness value along at least one of (i) a plurality of horizontal lines and (ii) a plurality of vertical lines of a display of the ultrasound system.

13. A method in accordance with claim 1, wherein the controlling comprises one of (i) reducing and (ii) turning off power to the transducer when a measured change in a parameter associated with the scanning information is within a determined range for a predetermined time period.

14. A method in accordance with claim 1, wherein the controlling comprises turning off power to the transducer based on the scanning information and turning power on after the power is turned off based on a user input.

15. A method in accordance with claim 1, wherein the controlling comprises reducing power to the transducer based on the scanning information and automatically increasing the power after the power is reduced when a measured change in a parameter associated with the scanning information is not within a determined range.

16. A method in accordance with claim 1, further comprising performing speckle reduction when the scanning information comprises spectral information.

17. A method in accordance with claim 1, further comprising monitoring changes in the received scanning information to control power to the transducer, and wherein the image information comprises maximum and minimum pixel values.

18. A method in accordance with claim 17, wherein the controlling is based on a measured change between the maximum and minimum pixel values.

19. A method in accordance with claim 1, wherein the image information comprises pixel information.

20. An ultrasound system having an idle mode and comprising:
a probe having a transducer, the probe operable to provide scanning information including at least one of image information and spectral information; and
a controller for controlling power to the transducer based upon the scanning information and wherein the scanning information is monitored more frequently when power to the transducer is reduced for the idle mode than when the transducer is powered for a non-idle mode.

21. An ultrasound system in accordance with claim 20 further comprising a speckle reduction filter to filter the spectral information.

* * * * *